(12) United States Patent  (10) Patent No.: US 8,340,723 B2
Rudrapatna  (45) Date of Patent: Dec. 25, 2012

(54) SMALL CELL BASE STATION, AND METHOD OF CONTROLLING A SMALL CELL BASE STATION

(75) Inventor: Ashok Rudrapatna, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 345 days.

(21) Appl. No.: 12/656,431

(22) Filed: Jan. 29, 2010

(65) Prior Publication Data

US 2011/0190022 A1   Aug. 4, 2011

(51) Int. Cl.
*H04M 1/00* (2006.01)
(52) U.S. Cl. ............... 455/561; 455/456.1; 455/574; 455/414.1; 455/418
(58) Field of Classification Search ............... 455/456.1, 455/574, 561, 414.1, 418
See application file for complete search history.

(56) References Cited

U.S. PATENT DOCUMENTS
2009/0285143 A1* 11/2009 Kwun et al. ............ 370/311

FOREIGN PATENT DOCUMENTS
EP   2 086 264   8/2009

OTHER PUBLICATIONS

International Search Report dated Mar. 17, 2011 for PCT/US2011/02144.
Article: "Dynamic Setup of HNBs for Energy Savings and Interference Reduction"; 3GPP TSG RAN WG3 Meeting #59bis, Shenzhen, China Mar. 31-Apr. 3, 2008.

* cited by examiner

*Primary Examiner* — Nghi H Ly
(74) *Attorney, Agent, or Firm* — Harness, Dickey & Pierce, P.L.C.

(57) ABSTRACT

In one embodiment, the method includes switching, at the base station, from a sleep state to a receive active state to detect whether service should be provided for an authorized mobile terminal. The base station disables transmission and associated processing and disables reception and associated processing in the sleep state. The base station disables transmission and associated processing in the receive active state, and the base station enables reception and associated processing in the receive active state. The method further includes switching, at the base station, from the receive active state to a full active state if the base station detects that service should be provided for an authorized mobile terminal. The base station enables transmission and associated processing and enables reception and associated processing in the full active state.

15 Claims, 5 Drawing Sheets

SMALL CELL BASE STATION, AND METHOD OF CONTROLLING A SMALL CELL BASE STATION

BACKGROUND

1. Field of the Invention

The present invention relates to telecommunications, in particular to wireless telecommunications.

2. Description of the Related Art

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as microcells, picocells, or femtocells, but we use the terms femtocell or small cell generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell.

Femtocell base stations are intended primarily for users belonging to a particular home or office. Femtocell base stations may be private access or public access. In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications.

Femtocell base stations are sometimes referred to as femtos.

Femtocell base stations are user-deployed base stations with a typical coverage range of tens of meters. They have extensive auto configuration and self-optimization capabilities so as to enable simple plug-and-play deployment, and are designed to automatically integrate themselves into an existing macrocellular network. In addition, femtos may include some functionality traditionally provided by a core network, namely a Serving GPRS Support Node (SGSN) and a Gateway GPRS Support Node (GGSN). One example of a femto is a UMTS Base Station Router (BSR), where UMTS denotes Universal Mobile Telecommunications System (UMTS), which integrates some functionality of a UMTS base station (NodeB), a Radio Network Controller (RNC), SGSN and GGSN.

SUMMARY

The present invention relates to a method of controlling a small cell base station.

In one embodiment, the method includes switching, at the base station, from a sleep state to a receive active state to detect whether service should be provided for an authorized mobile terminal. The base station disables transmission and associated processing and disables reception and associated processing in the sleep state. The base station disables transmission and associated processing in the receive active state, and the base station enables reception and associated processing in the receive active state. The method further includes switching, at the base station, from the receive active state to a full active state if the base station detects that service should be provided for an authorized mobile terminal. The base station enables transmission and associated processing and enables reception and associated processing in the full active state.

In one embodiment, the switching from a sleep state step is performed based on at least one state control parameter. For example, the state control parameter may be determined based on historical operation of the base station. As such, the state control parameter may change based on at least one of time of day, day of week, month of year, date etc. and a combination thereof.

In one embodiment, the state control parameters are received from a macro base station associated with the base station.

A further embodiment includes returning to the sleep state from the receive active state after a length of time if an authorized mobile terminal for which service should be provided is not detected.

Another embodiment includes switching from one of the sleep state and the receive active state to the full active state in response to a trigger from a macro base station associated with the base station.

An additional embodiment involves switching from the full active state to the sleep state after a period of inactivity at the base station.

The present invention also relates to a small cell base station.

In one embodiment the small cell base station includes signaling and data circuitry and a mode controller. The signaling and data circuitry includes circuitry for transmission and associated processing, and circuitry for reception and associated processing. The mode controller is configured to switch the signaling and data circuitry from a sleep state to a receive active state to detect whether service should be provided for an authorized mobile terminal. The signaling and data circuitry disables transmission and associated processing and disables reception and associated processing in the sleep state. The signaling and data circuitry disables transmission and associated processing in the receive active state, and the signaling and data circuitry enables reception and associated processing in the receive active state. The mode controller is further configured to switch the signaling and data circuitry from the receive active state to a full active state if the base station detects service should be provided for an authorized mobile terminal. The signaling and data circuitry enables transmission and associated processing and enables reception and associated processing in the full active state.

In another embodiment, the small cell base station, includes signaling and data circuitry. The signaling and data circuitry includes circuitry for transmission and associated processing, and the signaling and data circuitry includes circuitry for reception and associated processing. The small cell base station further includes a mode controller configured to switch the signaling and data circuitry from one of a sleep state and a receive active state to a full active state in response to a trigger from a macro base station associated with the base station. The signaling and data circuitry disables transmission and associated processing and disables reception and associated processing in the sleep state. The signaling and data circuitry disables transmission and associated processing in the receive active state, and the signaling and data circuitry enables reception and associated processing in the receive active state. The signaling and data circuitry enables transmission and associated processing and enables reception and associated processing in the full active state.

Some embodiments provide significant advantages over known approaches. For example, known approaches involve frequent periodic pilot transmissions when there is no active call connection involving the femtocell base station. This involves a basically continuous electromagnetic radiation exposure in the home, office, etc. Although, the inventors know of no proof of any health risks, it is widely believed that minimizing this exposure is desirable. The present invention in several embodiments address this perceived problem by usually disabling transmissions when the small cell base station is not in active use, so significantly reducing user concerns and thereby improving users' acceptance of deploying base stations in their homes, offices, etc.

Furthermore, controlling energy consumption of small cell base stations, in particular so as to help the environment, is increasingly becoming an issue. This is particularly important as the numbers of femtocells in use increases. The present invention in several embodiments reduces the energy used, by disabling transmission, reception and most processing for significant periods.

In femtocell deployments, it is possible that a pilot signal radiates strongly out of a home or office in a busy area where user terminals not registered with the femtocell base station they are passing by. In consequence, those passing mobile terminals make handover attempts or idle mode camping attempts to the femtocell base station causing signaling to and from the core network. Some embodiments of the present invention significantly reduce this signaling, because pilot signals are not sent if a mobile terminal passes by while the femto is in sleep state; and therefore, any camping attempts and associated signaling are not triggered.

Furthermore, some embodiments of the present invention reduce interference that transmissions from a femtocell base station provide to its neighboring femtocell base stations, as the transmissions are disabled most of the time.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION

Figure 1:
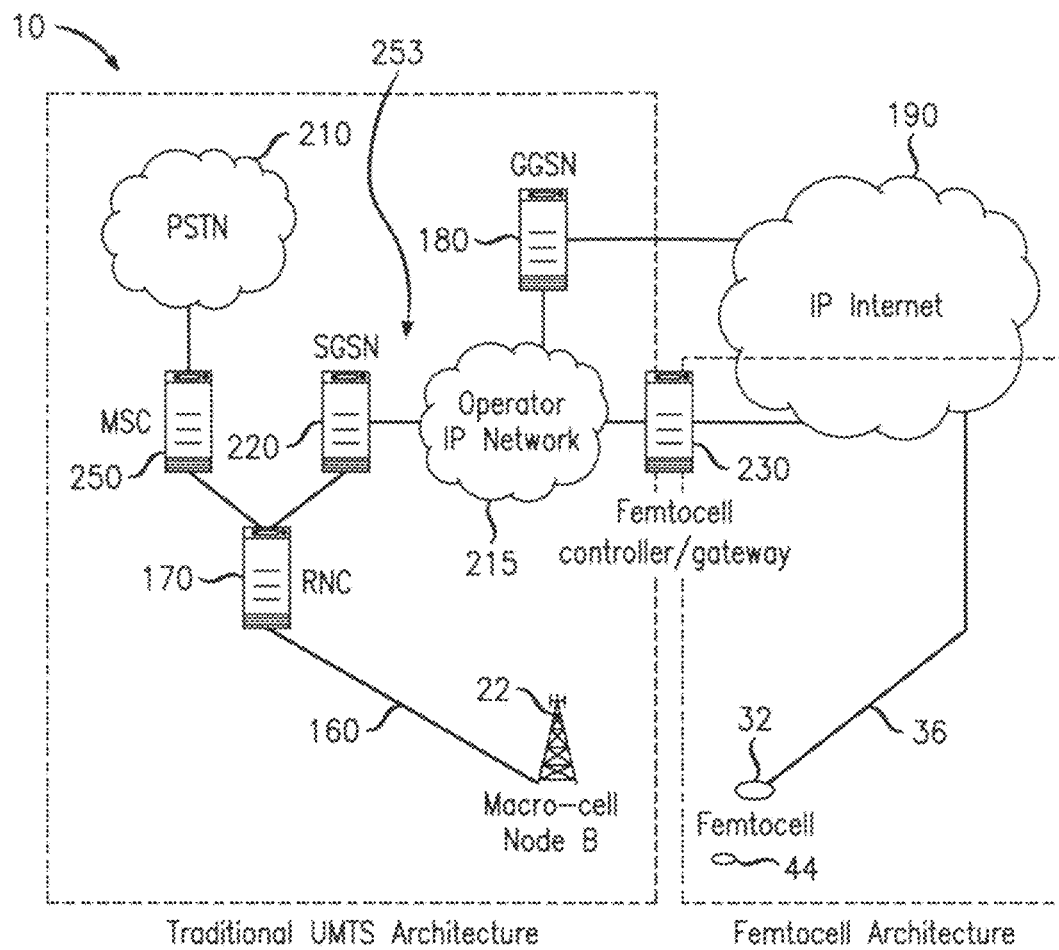
FIG. 1 is a diagram illustrating a wireless communications network according to a first embodiment of the present invention.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing," "computing," "calculating," "determining," "displaying," or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of tangible recording (or storage) medium or implemented over some type of transmission medium. The tangible storage medium may be magnetic (e.g., a floppy disk or a hard drive), optical (e.g., a compact disk read only memory, or "CD ROM"), solid state, etc; may be read only or random access; and may be volatile or non-volatile. Similarly, the transmission medium may be twisted wire pairs, coaxial cable, optical fiber, or some other suitable transmission medium known to the art. The example embodiments are not limited by these aspects of any given implementation.

As used herein, the term "mobile terminal" may be considered synonymous to, and may hereafter be occasionally referred to, as a mobile, mobile unit, mobile station, mobile user, subscriber, user, remote station, access terminal, receiver, user equipment, etc., and may describe a remote user of wireless resources in a wireless communication network. The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more users.

Also, as discussed above, cells that are smaller than macrocells are sometimes referred to as microcells, picocells, or femtocells, but we use the terms femtocell or small cell generically for cells that are smaller than macrocells.

We now describe a network including femtocell base stations then look in greater detail at a femtocell base station and its operation.

Network

Figure 2:
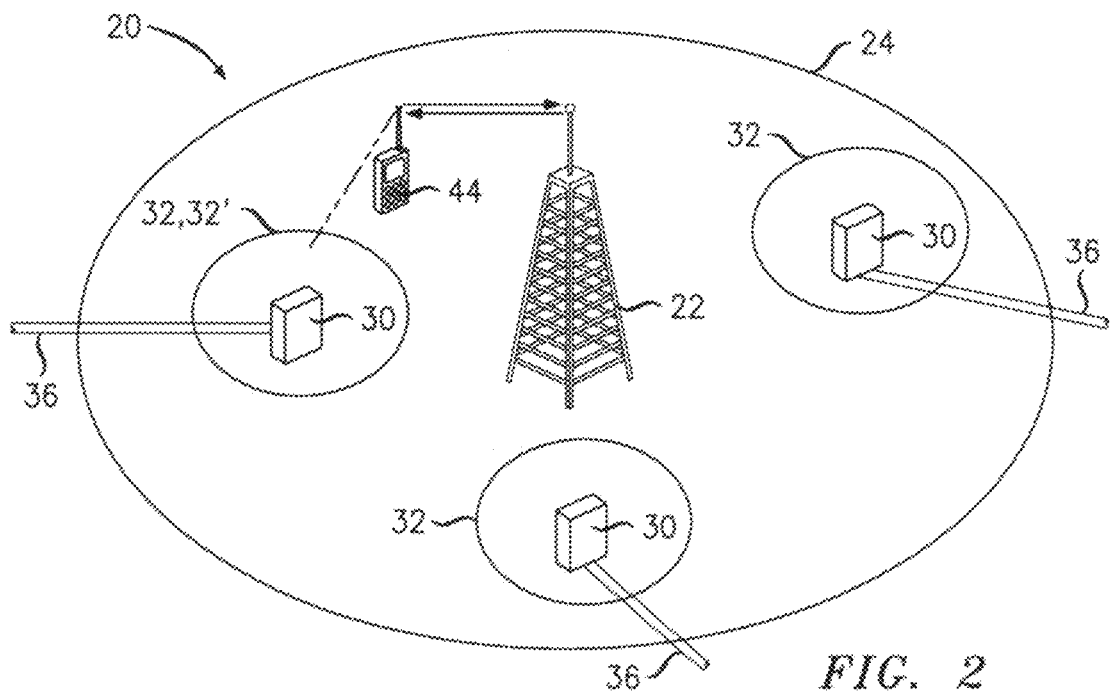
FIG. 2 is a diagram illustrating an example femtocell base station deployment within one macrocell shown in FIG. 1.

As shown in FIGS. 1 and 2, a network 10 for wireless communications, through which a user terminal 44 may roam, includes two types of base stations, namely macrocell base stations and femtocell base stations (the latter being sometimes called "femtos"). One macrocell base station 22 is shown in FIGS. 1 and 2 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than and at least partially included within that of the macrocell 24. For example, the femtocell 32 corresponds in size to a user's office or home.

As shown in FIG. 1, the network 10 is managed by a radio network controller, RNC, 170. The radio network controller, RNC, 170 controls the operation, for example by communicating with macrocell base stations 22 via a backhaul communications link 160. The radio network controller 170 maintains a neighbor list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching center 250 is provided with which the radio network controller 170 may communicate. The mobile switching center 250 communicates with a circuit-switched network such as a public switched telephone network (PSTN) 210. For packet-switched traffic, the network controller 170 communicates with service general packet radio service support nodes (SGSNs) 220 and a gateway general packet radio support node (GGSN) 180. The GGSN then communicates with a packet-switch core 190 such as, for example, the Internet.

The MSC 250, SGSN 220, GGSN 180 and operator IP network constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 30 of the femtocells 32. These connections to the femtocell controller/gateway 230 are broadband Internet Protocol connections ("backhaul") connections.

In FIG. 2, three femtocell base stations 30 and corresponding femtocells 32 are shown for simplicity.

It is possible for a mobile terminal 44 within the macrocell 24 to communicate with the macrocell base station 22 in any known manner. When the mobile terminal 44 enters into a femtocell 32 for which the mobile terminal is registered for communications within the femtocell base station 30, it is desirable to handle initiation of communication (e.g., calls) at the femtocell base station 30 and/or handover an existing connection with the mobile terminal from the macrocell to the femtocell. In the example shown in FIG. 2, the user of mobile terminal 44 is a registered user of the nearest 32' of the femtocells 32.

As will be appreciated, a public femtocell base station 30 will handle communications for any mobile terminal. However, a private femtocell base station 30 will handle communications only for authorized mobile terminals.

As shown in FIG. 2, the femtocell base stations 30 are connected via the broadband Internet Protocol connections ("backhaul") 36 to the core network and hence the rest of the telecommunications "world". The "backhaul" connections 36 allow communications between the femtocell base stations 30 through the core network. The macrocell base station is also connected to the core network.

Femtocell Base Station

Figure 3:
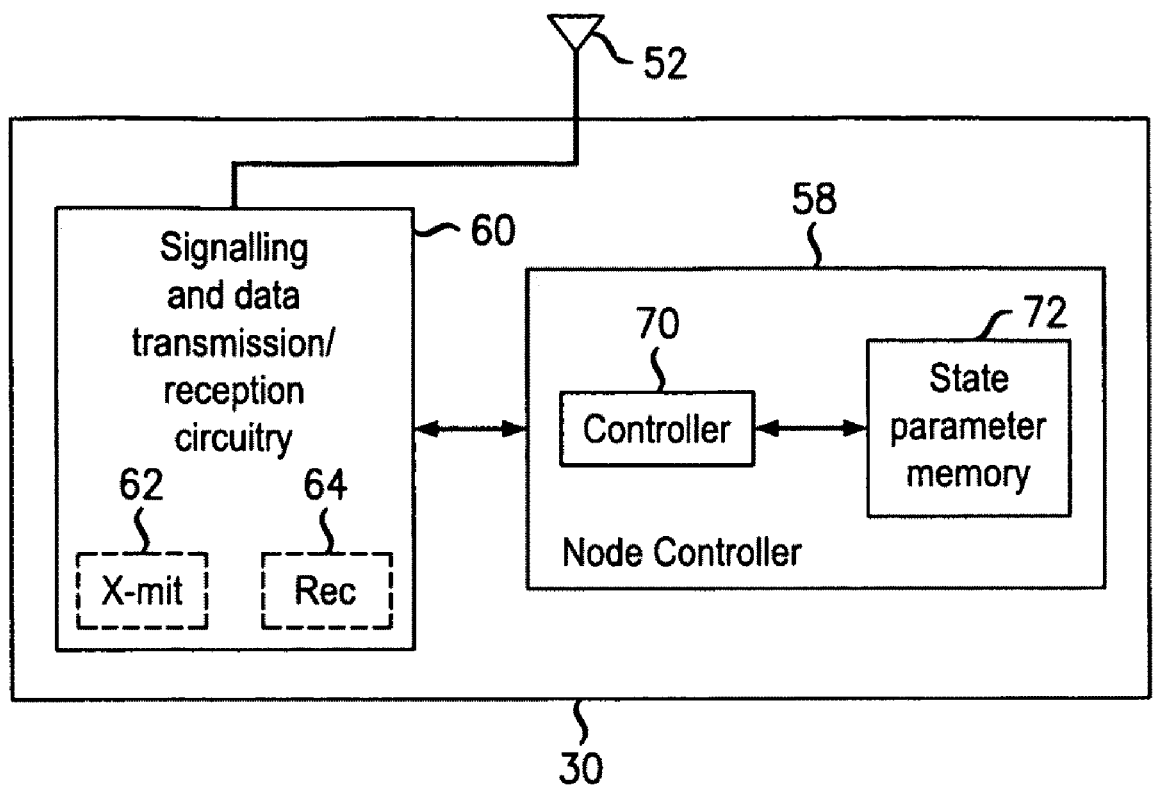
FIG. 3 is a diagram illustrating one of the femtocell base stations (or femtos) shown in FIG. 2.

FIG. 3 illustrates a femtocell base station or femto according to an embodiment. As shown in FIG. 3, each femto 30 includes an antenna 52 for transmission and reception, and includes signaling and data transmission/reception circuitry 60 for control signaling and for data. This circuitry 60 includes transmission circuitry 62 and reception circuitry 64. The transmission circuitry 62 handles transmission and associated processing, and the reception circuitry 64 handles reception and associated processing. It will be appreciated that the transmission and reception circuitry may share circuits and has been illustrated as separate elements only for the sake of description.

A mode controller 58 controls the operational state of the signaling and data transmission/reception circuitry 60. In particular, the mode controller 58 controls whether the circuitry 60 is in a sleep state, receive active state, or a full active state. In the sleep state, the circuitry 60 disables transmission and associated processing. Accordingly, the femto 30 does not transmit any signal such as beacons, pilots, broadcast, user data signals, etc. In the sleep state, the femto 30 also disables reception and associated processing. Accordingly, the femto 30 does not receive and process any signals transmitted by nearby mobile terminals. In the sleep state, the femto 30 does not consume much energy, does not generate electromagnetic radiation, and does not generate interference. In the receive active state, the circuitry 60 disables transmission and associated processing, but enables reception and associated processing. Accordingly, in the receive active state energy consumption is still reduced as compared to the full active state described below, electromagnetic radiation is not produced, and interference is not generated. In the full active state, the circuitry 60 enables reception and associated processing, and enables transmission and associated processing. Namely, in the full active state, the circuitry 60 operates in the conventional manner.

As shown in FIG. 3, the mode controller 58 includes a controller 70 and state parameter memory 72. The state parameter memory 72 stores a plurality of state parameters, and may be any type of memory. For example, the memory 72 may be a volatile or non-volatile memory, may be a RAM or a ROM, etc. The controller 70 controls the state of the circuitry 60 based on the state parameters stored by the memory 72. The state parameters will be described in detail below with respect to FIG. 4.

Figure 4:
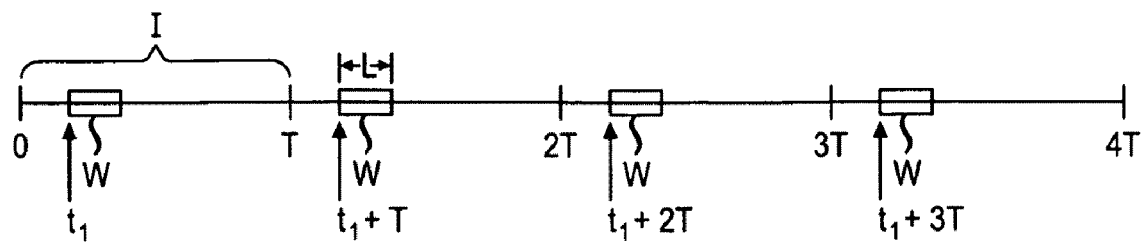
FIGS. 4-6 illustrates example operations of femto in the sleep state.

FIG. 4 illustrates an example operation of femto 30 in the sleep state. As shown, the sleep state may be a periodic operation over an interval of time I. During each interval I of duration T, the femto switches from the sleep state to the receive active state W. The duration T is a state parameter stored in the memory 72. The point in time, t1 in FIG. 4, during the interval I that the femto switches to the receive active state W is also a state parameter stored in the memory 72. Still further, the length of time L that the femto 30 remains in the receive active state is a state parameter stored in the memory 72. Accordingly, as shown in FIG. 4, based on these state parameters, the controller 70 may control transition from the sleep state to the receive active state, and back to the sleep state again. As will be described in more detail below, during the receive active state the femto 30 monitors transmissions by nearby mobile terminals. If the femto 30 detects a mobile terminal should be served (e.g., the mobile terminal initiates communication) and the mobile terminal is authorized to be served by the femto 30, the femto 30 will switch to the full active state.

As shown in FIG. 4, the start time of the receive active state may be periodic. Stated another way, the start time may be the same in each interval I. Also, the length of time the femto 30 is in the receive active state may be the same for each interval I. However, the present invention is not limited to these operational constraints.

Figure 5:
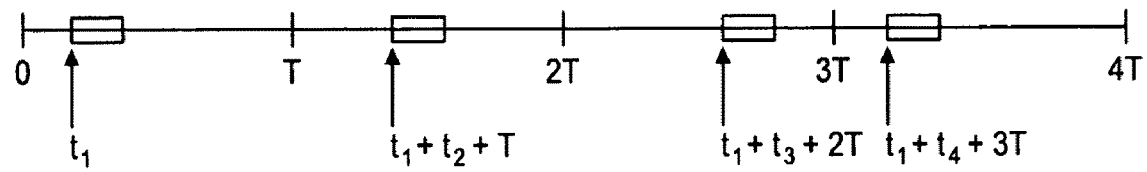
Figure 6:
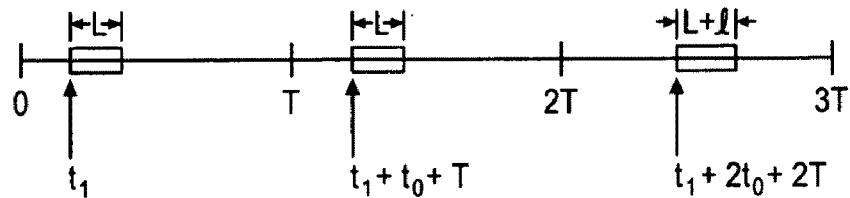

For example, as shown in FIG. 5, the start time of the receive active state may vary from interval I to interval I. In one embodiment, the start time may be randomly generated by the controller 70. Still further, as shown in FIG. 6, the start time may progressively shift from interval I to interval I. In FIG. 6, the shift is a fixed offset t0, but the invention is not limited to a fixed offset. FIG. 6 also shows that the length of time the femto 30 remains in the receive active state may vary from interval I to interval I. Additionally, while the intervals have been shown as having a fixed length of time T, this time may also be varied. For instance, the memory 72 may store state parameters setting forth the sleep and receive active states that vary based on time of day, day of week, month of year, date, etc. As will be appreciated any design is possible by programming the memory 72 with desired state parameters.

In one embodiment, the state parameters may be set to default set. In another embodiment, the state parameters may be user programmable. In another embodiment, discussed in detail below with respect to FIG. 9, the state parameters may be autonomously and adaptively determined. Still further, the memory 72 may store state parameters sent by the macrocell. Again, it will be appreciated that any method of determining and storing the state parameters may be implemented.

Operation

Figure 7:
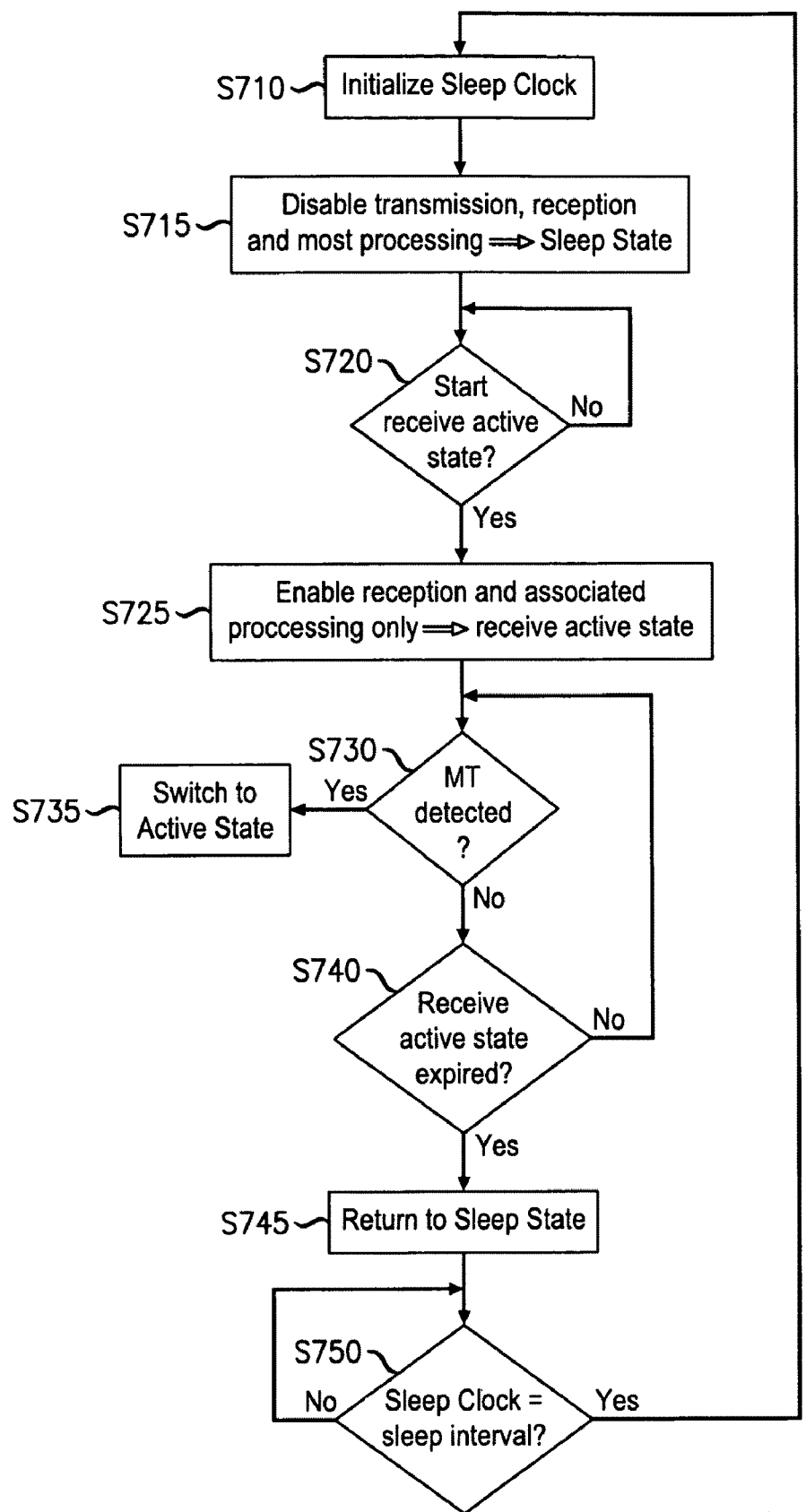
FIG. 7 illustrates a flowchart of the operation of a femto according to an embodiment.

Operation of the femto 30 will now be described in detail with respect to FIG. 7. FIG. 7 illustrates a flowchart of the operation of femto 30 according to an embodiment. It is assumed, with respect to FIG. 7, that the femto 30 has entered the sleep state. For example, after a period of inactivity at the femto 30, the mode controller 58 may switch the circuitry 60 from the full active to the sleep state and begin the process illustrated in FIG. 7.

As shown, in step S710 the controller 70 initializes a sleep clock to zero and starts the sleep clock. In step S715, the controller 70 places the circuitry 60 in the sleep state. Accordingly, the transmission, reception and associated processing are disabled. Then, the controller 70 determines if the sleep clock has reached the time to place the circuitry 60 in the receive active state in step S720. Here, the controller 70 obtains the point in time to start the receive active state from the memory 72. As discussed above, this point in time is one of the state parameters stored in the memory 72. As further discussed, the point in time retrieved may depend on the time of day, day of week, month, date, etc. or combination thereof. If the time indicated by the sleep clock equals the point in time retrieved from the memory 72, then in step S725, the controller 70 switches the circuitry 60 from the sleep state to the receive active state. Otherwise, step S720 is continuously repeated until the sleep clock equals the time to start the receive active state.

Having been placed in the receive active state, the femto 30 may receive signals from nearby mobile terminals. In step S730, the circuitry 60 will be able to retrieve and process any signal transmitted by a mobile terminal that the femto 30 is designed to receive. The circuitry 60 monitors received signals to detect whether service should be provided for an authorized mobile terminal. For example, if the femto 30 receives an access probe (AP) from a mobile terminal that exceeds a threshold power level, the circuitry 60 determines whether the mobile terminal is an authorized mobile terminal. If the femto 30 is a public femto, then the mobile terminal is assumed authorized. However, if the femto 30 is a private femto, then the femto 30 will provide service only for those mobile terminals authorized to use the femto. This authorization process is well-known, and will not be described in detail for the sake of brevity.

Assuming the mobile terminal detected is authorized, then the circuitry 60 notifies the controller 70, and the controller 70 switches the circuitry 60 to the full active state in step S735. Thus, the circuitry 60 may react to the mobile terminal; provide the appropriate response messages to the mobile terminal; and provide communication services to the mobile terminal. The femto 30 may also simultaneously signal the macrocell 22 over the backhaul that it has woken up and will handle service to the mobile terminal. If the circuitry 60 does not detect an authorized mobile terminal, then in step S740, the controller 70 determines if the length of time for the receive active state has expired. Namely, the controller 70 obtains the length of time for the receive active state from the memory 72 as one of the state parameters. If the sleep clock equals the start time of the receive active state plus the length of time for the receive active state, then the controller 70 determines that that the receive active state should end, and switches the circuitry 60 back to the sleep state in step S745. Otherwise, processing returns to step S730 and monitoring for mobile terminals continues.

Once back in the sleep state, the controller 70 determines whether the sleep interval I has expired in step S750. Namely, the controller 70 obtains the period of the interval from the memory 72 as a state parameter. And, if the sleep clock equals the time for the interval, the controller 70 determines that the sleep interval has expired. As a result processing returns to step S710 where the sleep clock is initialized (or reset), and the next sleep interval begins. If the sleep clock has not reached the sleep interval period in step S750, then processing remains at step S750 until the sleep clock does reach the sleep interval period.

As will be appreciated, the femto 30 is kept at a low energy consumption sleep state during periods of inactivity. The femto 30 is wakened, but only in reception mode, to determine if the femto 30 should resume full activity. In this reception mode, no transmission by the femto 30 takes place. Accordingly, energy consumption remains reduced, electromagnetic radiation remains non-existent, and interference from the femto 30 remains negligible.

As discussed above, once in the full active state, the mode controller 58 may switch the circuitry 60 to the sleep state after a period of inactivity in the full active state. For example, if the femto 30 has not handled communication from a mobile terminal for a threshold amount of time, the mode controller 58 places the circuitry 60 in the sleep state. The mode controller 58 may also signal the macrocell 22, over the backhaul, that the femto 30 has been placed in the sleep state. Still further, instead of directly placing the circuitry 60 in the sleep state, the mode controller 58 may first place the circuitry 60 in the receive active state for a period of time. If the circuitry 60 does not detect any authorized mobile terminals should be serviced during this period of time, then the mode controller 58 places the circuitry 60 in the sleep state. However, if the circuitry 60 does detect an authorized mobile terminal should be serviced, then the mode controller 58 returns the circuitry 60 to the full active state.

Figure 8:
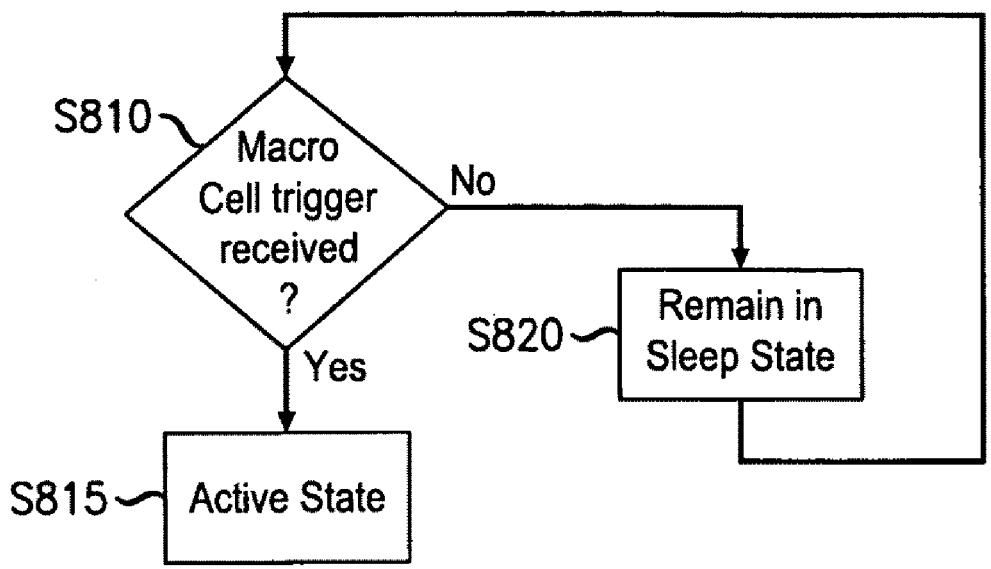
FIG. 8 illustrates a flow chart of the operation of a femto according another embodiment.

FIG. 8 illustrates a flow chart of the operation of the femto 30 according another embodiment. This embodiment may be performed concurrently with the embodiment of FIG. 7, or may be performed even if the embodiment of FIG. 7 is not. This embodiment contemplates that a mobile terminal has already established a communication session via the macrocell base station, and the macrocell determines to handoff serving the mobile terminal to the femto 30 while the femto 30 is in the sleep or receive active state. Here, the macrocell 22 may determine that the mobile terminal is authorized to receive services from the femto 30. Namely, the macrocell 22 may store the same authorizing information as the femtos. Having made the above determination, the macrocell 22 sends a handoff request to the femto 30 over an appropriate backhaul. This is just one example of a trigger that the macrocell 22 may send to the femto 30 to ensure the femto 30 is in the full active state. Namely, the present invention is not limited to this handover example as the trigger.

In step S810 of FIG. 8, the controller 70 determines if a trigger to bring the femto 30 out of the sleep state should the femto 30 currently be in the sleep state is received from the macrocell. If no, the femto remains in the sleep state in step S820, and processing returns to step S810. If the determination in step S810 is positive, then in step S815, the controller 70 switches the circuitry 60 to the full active state.

As an alternative, after the femto 30 may also determine whether the mobile terminal is an authorized user of the femto 30. If authorized, the femto 30 remains in the full active state. If not authorized, the femto 30 returns to the sleep state. Alternatively, this authorization determination may be performed in the receive active state, and then proceed to the full active state if the mobile terminal is determined as an authorized user.

Other Embodiments

Figure 9:
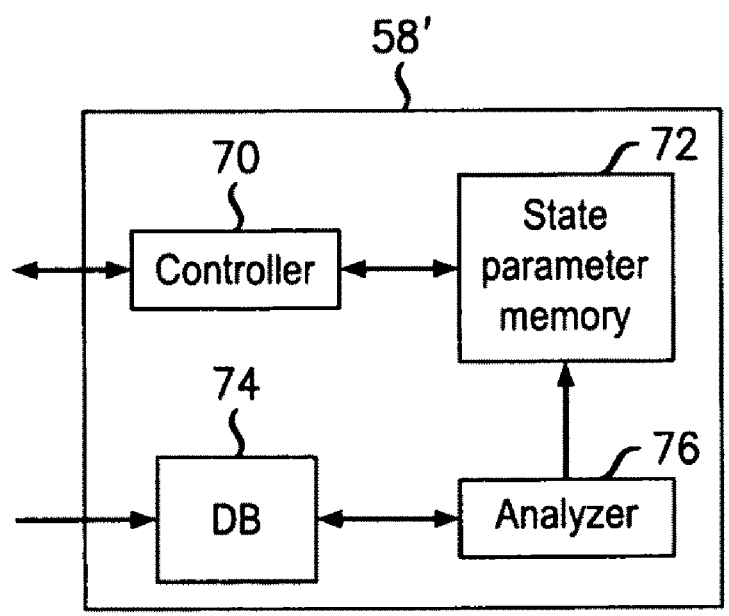
FIG. 9 illustrates the mode controller of a femto according to another embodiment.

FIG. 9 illustrates the mode controller of a femto according to another embodiment. As shown, the mode controller 58' includes a controller 70 and state parameter memory 72 as discussed above. However, the mode controller 58' also includes a database 74 and an analyzer 76. The database 74 receives activity information from the circuitry 60. Namely, the database 74 stores information on the state of the circuitry 60. For example, the database 74 stores information indicating the length and time the femto 60 was in at least the sleep state and the full active. This information is cataloged over days, weeks, months and by date.

The analyzer 76 analyzes the historical operation information in database 74 for trends. For example, the femto 30 may be placed in a shopping mall, and the information in database 74 indicates that the femto 30 stays in the sleep mode from 10 pm 12 am and from 12 am to 10 am each weekday. Based on this historical operation information, the analyzer 76 may set a much longer sleep interval for these periods of time, than other periods of the day when the femto 30 becomes more active. As will be appreciated, the analyzer 76 may be programmed to identify patterns based on time of day, day of week, month, date, etc. and combinations thereof.

The state parameters stored in the memory 72, whether determined as described above or programmed therein, may be signaled to the macrocell 22 over the backhaul.

It will be appreciated, that instead of being located at the femto 30, the database 74 and analyzer 76 may be located at the macrocell 22, and the macrocell 22 may send the determined state parameters to the femto 30 for storage in the memory 72. For example, the state parameters may be communicated in overhead messages from the macrocell 22.

As a further alternative to the previously described embodiments, the femto 30 may include an indicator light that is externally visible. The indicator light may be configured to indicate the state of the femto. For example, the indicator light may display different colors depending on whether the femto 30 is in the sleep state or full active state. Additionally, or alternatively, the indicator light may provide a different display depending on the state of the femto 30. For example, the indicator light may blink in the sleep state, and may be steady in the full active state. While different displays and colors were described for only the sleep and full active states, a display and/or color may also be provided for indicating the receive active state.

The invention being thus described, it will be obvious that the same may be varied in many ways. Such variations are not to be regarded as a departure from the invention, and all such modifications are intended to be included within the scope of the invention.

I claim:

1. A method of controlling a small cell base station, comprising:
   switching, at the base station, from a sleep state to a receive active state based on at least one state control parameter based on historical operation of the base station in order to detect whether service should be provided for an authorized mobile terminal, the base station disabling transmission and associated processing and disabling reception and associated processing in the sleep state, the base station disabling transmission and associated processing in the receive active state, and the base station enabling reception and associated processing in the receive active state; and
   switching, at the base station, from the receive active state to a full active state if the base station detects that service should be provided for an authorized mobile terminal, the base station enabling transmission and associated processing and enabling reception and associated processing in the full active state.

2. The method of claim 1, wherein the switching from a sleep state step is performed periodically during the sleep state.

3. The method of claim 1, wherein the switching from a sleep state step is performed randomly during the sleep state.

4. The method of claim 1, wherein the state control parameter changes based on at least one of time of day, day of week, month of year, and date.

5. The method of claim 1, further comprising:
   receiving the state control parameter from a macro base station or network controller.

6. The method of claim 1, further comprising:
   returning to the sleep state from the receive active state after a length of time if the base station does not detect that service should be provided for an authorized mobile terminal.

7. The method of claim 6, wherein if the base station detects an authorized mobile terminal initiating communication, the base station detects that service should be provided to the authorized mobile terminal.

8. The method of claim 6, further comprising:
   determining the length of time based on historical operation of the base station.

9. The method of claim 6, wherein the length of time changes based on at least one of time of day, day of week, month of year, and date.

10. The method of claim 6, further comprising:
    receiving the length of time from a network controller or a macro base station.

11. The method of claim 1, wherein a limited number of mobile terminals are authorized mobile terminals.

12. The method of claim 1, further comprising:
    switching from one of the sleep state and the receive active state to the full active state in response to a trigger from at least one of a network controller and a macro base station.

13. The method of claim 1, further comprising:
    switching from the full active state to the sleep state after a period of inactivity at the base station.

14. The method of claim 1, further comprising:
    switching from the full active state to the receive active state after a first period of inactivity at the base station; and
    switching from the receive active state to the sleep state after a second period of inactivity at the base station.

15. A small cell base station, comprising:
    signalling and data circuitry, the signalling and data circuitry including circuitry for transmission and associated processing, the signalling and data circuitry including circuitry for reception and associated processing; and
    a mode controller configured to,
        switch the signalling and data circuitry from a sleep state to a receive active state based on at least one state control parameter based on historical operation of the base station in order to detect whether service should be provided for an authorized mobile terminal, the signalling and data circuitry disabling transmission and associated processing and disabling reception and associated processing in the sleep state, the signalling and data circuitry disabling transmission and associated processing in the receive active state, and the signalling and data circuitry enabling reception and associated processing in the receive active state; and
        switch the signalling and data circuitry from the receive active state to a full active state if the base station detects that service should be provided for an authorized mobile terminal, the signalling and data circuitry enabling transmission and associated processing and enabling reception and associated processing in the full active state.

* * * * *